United States Patent
Rossmann et al.

(10) Patent No.: US 8,250,575 B2
(45) Date of Patent: Aug. 21, 2012

(54) METHOD AND SYSTEM FOR MANAGING TRANSACTIONS UTILIZING A BASIS MEMORY AND A TRANSACTION MEMORY

(75) Inventors: Albert Rossmann, Wiesloch (DE); Stefan Schulz, Neu-Isenburg (DE)

(73) Assignee: SAP AG, Walldorf (DE)

( * ) Notice: Subject to any disclaimer, the term of this patent is extended or adjusted under 35 U.S.C. 154(b) by 1270 days.

(21) Appl. No.: 11/965,812

(22) Filed: Dec. 28, 2007

(65) Prior Publication Data

US 2009/0172673 A1 Jul. 2, 2009

(51) Int. Cl.
*G06F 9/46* (2006.01)
(52) U.S. Cl. ......................................... 718/100
(58) Field of Classification Search ................... 718/100
See application file for complete search history.

(56) References Cited

U.S. PATENT DOCUMENTS

| | | | | | |
|---|---|---|---|---|---|
| 4,627,019 | A | * | 12/1986 | Ng | 707/695 |
| 5,452,445 | A | * | 9/1995 | Hallmark et al. | 1/1 |
| 5,995,972 | A | * | 11/1999 | Allgeier | 1/1 |

* cited by examiner

*Primary Examiner* — Meng An
*Assistant Examiner* — Blake Kumabe

(57) ABSTRACT

A method and system for managing transactions is provided. A transaction is initiated on a first data by a first entity with the first data being comprised in a basis memory. A change in the first data is moved as a second data to a transaction memory. The second data is read from the transaction memory if a request for reading the first data is received from the first entity. The first data is read from the basis memory if the request for reading the first data is received from a second entity. The write access of the second entity to the first data is locked.

19 Claims, 5 Drawing Sheets

METHOD AND SYSTEM FOR MANAGING TRANSACTIONS UTILIZING A BASIS MEMORY AND A TRANSACTION MEMORY

TECHNICAL FIELD

Embodiments of the invention generally relate to computer systems, and more particularly to a method and system for managing transactions.

BACKGROUND

In computer systems, a transaction is typically an activity starting at a first point in time and ending at a second point in time. The activity may include one or more accesses to the memory including read accesses and write accesses.

In typical scenarios where several users initiate transactions simultaneously on a same set of data, a portion of the data changed by one of the users may affect other users. A typical solution to this problem is to allow only one transaction at a time on the set of data while blocking all other transactions initiated on the data until a current transaction is terminated. This may lead to long queues of transactions waiting for their turn to access the data. In a typical software development scenario, where several groups of users have to work on the same set of data, this solution proves very inefficient as the long waiting times to access the data may lead to considerably long development cycles. Current systems usually address the above indicated problems by generating a deep copy for each user initiating a transaction on the data. The deep copy is generally an exact copy of the set of data for which a transaction is initiated. The users typically work with the deep copies issued to them and all the deep copies are generally put together in a validation cycle. As each of the users work with a separate copy of the data, none of the users are aware of the changes carried out to the data by other users. This may lead to inconsistency of data during the validation cycle which may further elongate the development cycle. In addition, if an error occurs during a transaction the data is left in an inconsistent state and there is no way to retrieve the original data as it existed before the transaction was initiated.

In addition, current systems also use the deep copy when read only accesses must be given to one or more users. As the user works with a copy of the data instead of the original data, it ensures the safety of the original data. Thus changes to the data made by the user are actually made to the deep copy of the data. The deep copy is typically destroyed on the termination of a read only transaction.

As the deep copy is an exact copy of the original data, it occupies the same amount of space as the original data itself. In addition, generating each deep copy consumes an amount of system time. Thus generating a number of deep copies for various users consumes a lot of system resources and affects overall performance of the system.

SUMMARY OF THE INVENTION

Embodiments of the invention are generally directed to a method and system for managing transactions. A transaction is initiated on a first data by a first entity with the first data being comprised in a basis memory. A change in the first data is moved as a second data to a transaction memory. The second data is read from the transaction memory if a request for reading the first data is received from the first entity. The first data is read from the basis memory if the request for reading the first data is received from a second entity. The write access of the second entity to the first data is locked.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for managing transactions. A transaction is initiated on a first data by a first entity with the first data being comprised in a basis memory. A change in the first data is moved as a second data to a transaction memory. The second data is read from the transaction memory if a request for reading the first data is received from the first entity. The first data is read from the basis memory if the request for reading the first data is received from a second entity. The write access of the second entity to the first data is locked.

Figure 1:
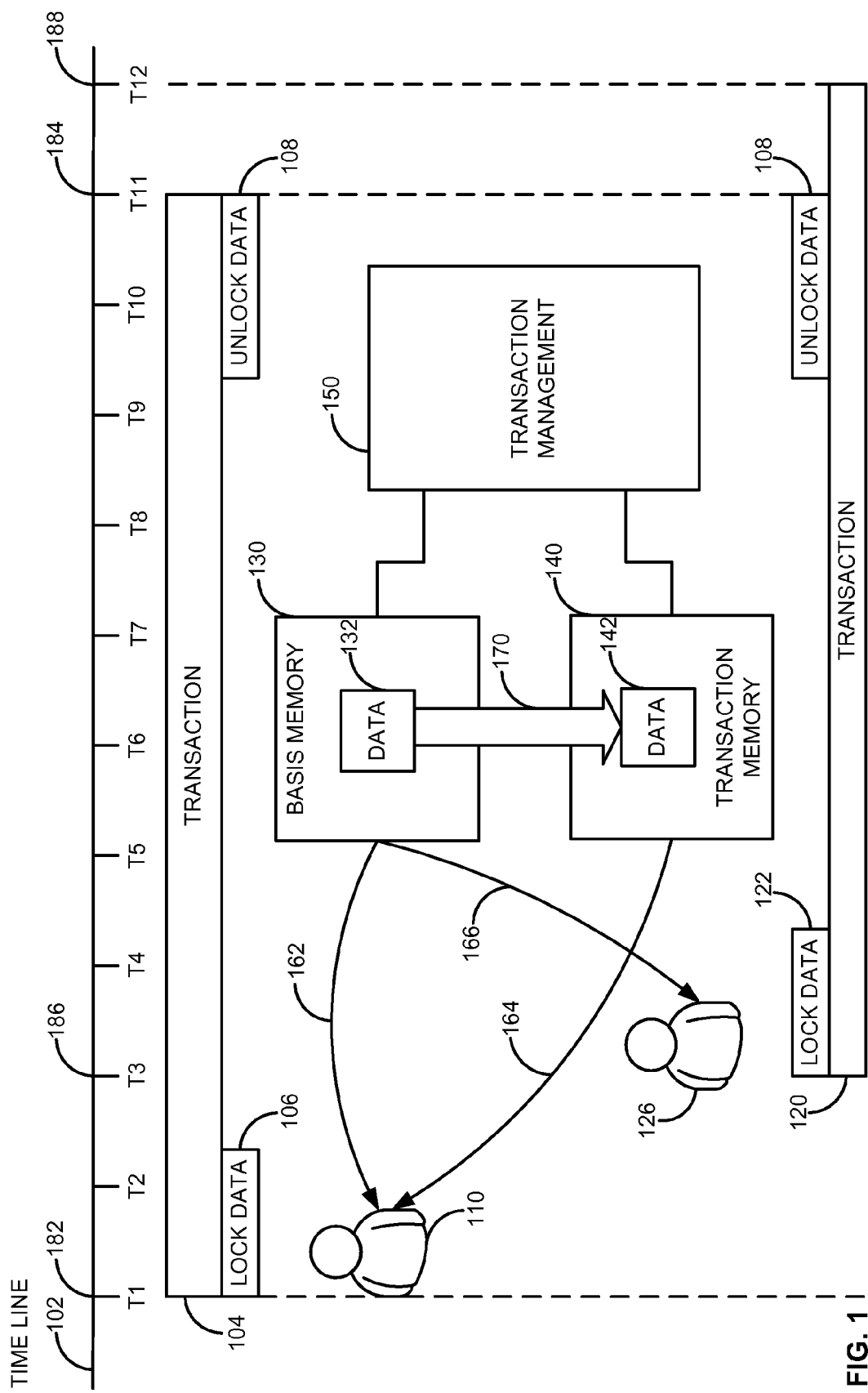
FIG. 1 is a functional block diagram of a system for managing transactions according to an embodiment of the invention.

FIG. 1 is a functional block diagram of a system for managing transactions according to an embodiment of the invention. Transaction management 150 manages transaction 104 and transaction 120 initiated on data 132. Transaction 104 is initiated by user 110 and transaction 120 is initiated by user 126. Data 132 is typically stored in basis memory 130. In an embodiment, data 132 is a part of a set of data, a cluster of data or a page of data. Transaction 104 is initiated by user 110 at time T1 182 on time line 102 and terminated at time T11 184 on time line 102. Similarly, transaction 120 is initiated by user 126 at time T3 186 on time line 102 and terminated at time T12 188 on time line 102. Transactions 104 and 120 may include one or more accesses to basis memory 130. Accesses to basis memory 130 may include a read access and a write access. A read access typically includes reading data 132 from basis memory 130 or transaction memory 140. A write access typically includes changing or writing on to data 132 stored in basis memory 130.

As soon as transaction 104 is initiated at time T1 182 by user 110 on data 132, data 132 is locked 106 for exclusive write access to user 110. Data 132 is unlocked 108 for write access at time T11 184 on the termination of transaction 104. Transaction 120 initiated at a later point in time T3 186 finds data 132 locked 122 for write access by transaction 104. Thus user 126 may not have a write access to data 132 starting from time T3 186 until time T11 184 when transaction 104 unlocks 108 data 132 for write access. Thus user 126 has write access to data 132 between time T11 184 and time T12 188 at which transaction 120 is terminated.

In an embodiment as transaction 120 is initiated on data 132 at time T3 186, transaction management 150 determines that transaction 104 is already working on data 132 and denies write access to user 126. As transaction 104 is terminated at time T11 184, transaction management 150 releases write access to user 126. In an embodiment transaction management 150 notifies user 126 on initiation of transaction 120 at time T3 186 that transaction 104 is already working on data 132. Similarly, transaction management 150 notifies user 126 of the termination of transaction 104 at time T11 184. For every request for read access or write access received from user 110 or user 126, transaction management 150 checks and determines whether the request is received from user 110 or user 126.

As user 110 requests a write access to data 132 to change data 132 to data 142, transaction management 150 knowing that transaction 104 belongs to user 110, grants a permission for write access to user 110. Transaction memory 140 typically stores one or more changes to data 132 as data 142. Thus on a write access to data 132 by user 104, data 132 is transferred 170 to transaction memory 140 and immediately changed to data 142 as requested by user 110. Transaction memory does not store original data 132 and stores only the change in data 132 as data 142 to avoid any unnecessary replication of data 132. In an embodiment, for every request for write access made by user 110, transaction management 150 checks for already existing changes to data 132 stored as data 142 in transaction memory 170. If user 110 makes subsequent requests to change data 132 and if data 142 already exists in transaction memory 140, a subsequent change is made to data 142 in transaction memory 140 instead of making the subsequent change to data 132 in basis memory 130.

As user 110 requests for a read access to data 132, transaction management 150 checks for any recent changes made by user 110 to data 132 and stored as data 142 in transaction memory 140. If data 142 exists in transaction memory 140, data 142 is read and sent 164 to user 110. If no changes to data 132 exist as data 142 in transaction memory 140, data 132 is read from basis memory 130 and sent 162 to user 110.

As user 126 requests for a read access to data 132 between time T3 186 and time T11 184 of transaction 120, data 132 is read from basis memory 130 and sent 166 to user 126. If user 126 requests a write access to data 132 between time T3 186 and time T11 184 of transaction 120, transaction management 150 denies write access to user 126 as data 132 is locked for exclusive write access by user 110 between time T1 182 and time T11 184. If user 126 requests for a write access to data 132 during time T11 184 and time T12 188 of transaction 120, transaction management 150 grants the write access as user 110 terminates transaction 104 at time T11 184 and unlocked data 132 for write access. Thus the request for write access by user 126 is handled by transaction management 150 in exactly the same manner as the request for write access by user 110 is handled by transaction management 150 during T1 182 and T11 184. Similarly, A request for read access by user 126 between time T11 184 and time T12 188 is handled by transaction management 150 in exactly the same manner as the request for read access by user 110 is handled by transaction management 150 during T1 182 and T11 184.

In an embodiment, transaction 104 and transaction 120 may be terminated by user 110 and user 126 respectively by initiating a commit or a rollback. A commit typically includes replacing data 132 in basis memory 130 with data 142 of transaction memory 140. Data 142 is typically deleted from transaction memory 140 after a commit is completed. A rollback typically includes deleting data 142 without making any changes to data 132. Transaction 104 and 120 are typically terminated immediately after the completion of a commit or a rollback. In an embodiment, a rollback is automatically initiated by transaction management 150 if an error occurs during transaction 110 or 120. In an embodiment, a rollback is automatically initiated if transaction 110 or 120 is manually terminated by user 104 or user 126 respectively without initiating a commit or rollback.

Figure 2:
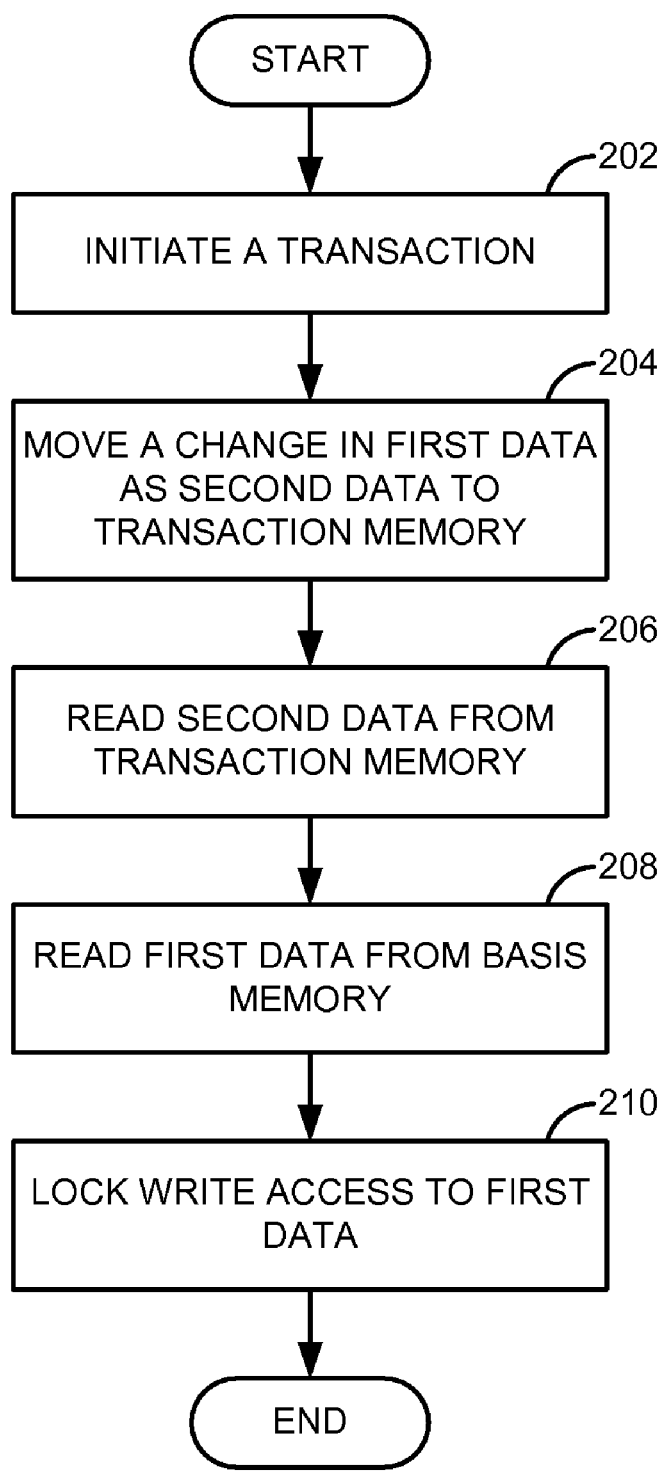
FIG. 2 is a flow diagram of a process for managing transactions according to an embodiment of the invention.

FIG. 2 is a flow diagram of a process for managing transactions according to an embodiment of the invention. In process block 202, a transaction is initiated on a first data by a first entity. The first data is typically stored in a basis memory. The first entity may be either a user or a computer program. In process block 204, a change in the first data is moved as a second data to a transaction memory. The change in the first data is typically made by the first entity after initiating the transaction. In process block 206, the second data is read from the transaction memory if the request for reading the first data is received from the first entity. In process block 208, the first data is read from the basis memory if the request for reading the first data is received from a second entity. The second entity may either be a user or a computer program. The second entity typically makes the request for reading the first data during the transaction initiated by the first entity. In process block 210, a write access of the second entity to the first data is locked typically starting from a first point in time when the transaction is initiated by the first entity till a second point in time when the transaction is terminated.

Figure 3:
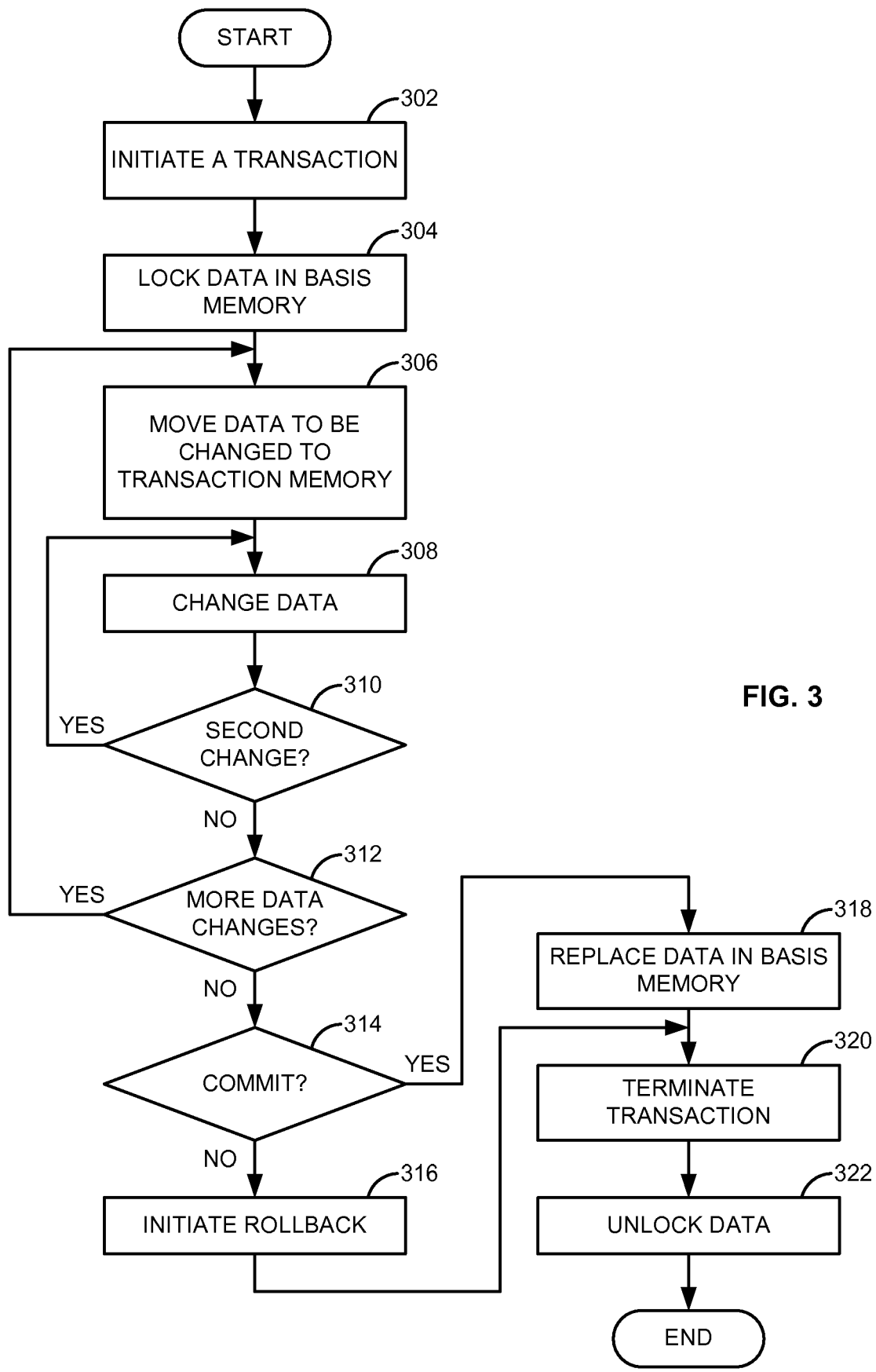
FIG. 3 is a flow diagram of a process for managing transactions according to an embodiment of the invention.

FIG. 3 is a flow diagram of a process for managing transactions according to an embodiment of the invention. In process block 302, a transaction is typically initiated by a first entity on a data. The first entity may either be a user or a computer program. The data is typically stored in a basis memory. The data may include a cluster of data, a data page, a group of data and the like. In process block 304, the data in the basis memory is locked for exclusive write access by the first entity typically immediately after the transaction is initiated by the first entity. In process block 306, a part of the data to be changed by the first entity is moved to a transaction memory. The part of the data may include one or more memory locations in the basis memory storing the data. In process block 308, the part of the data is changed in the transaction memory as required by the first entity and stored as a new data in the transaction memory. In decision block 310, if a second change in the new data is requested by the first entity, the process moves back to process block 308 where a second change is made to the new data stored in the transaction memory. In decision block 310, if no second change to the data stored in the basis memory is requested by the first entity, the process moves to decision block 312. In decision block 312, if more changes are requested to any other parts of the data stored in the basis memory, the process moves back to process block 304 where the part of the data to be changed is moved to the transaction memory. In decision block 312, if no more changes are requested to any other parts of the data, the process moves to decision block 314.

In decision block 314, if the first entity does not initiate a commit on the transaction, the process moves to process block 316 where a rollback is initiated on the transaction. In decision block 314, if a commit is initiated on the transaction by the first entity, process block moves to process block 318 where part of the data in the basis memory is replaced by the new data from the transaction memory. In process block 320, the transaction is terminated typically including deleting the new data from the transaction memory. In process block 322, the data is unlocked to allow write access to other entities. The other entities may either be user or computer programs.

Figure 4:
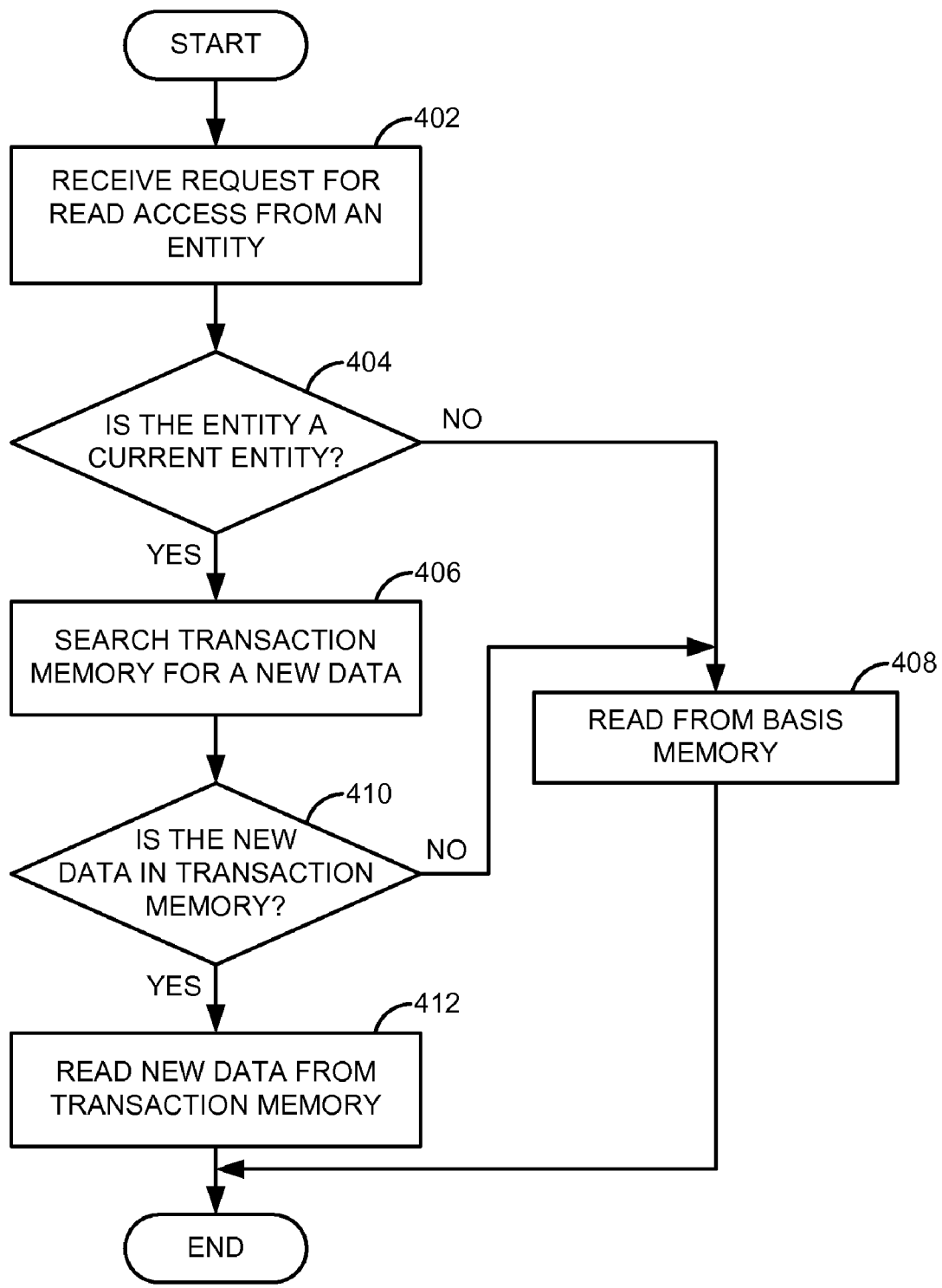
FIG. 4 is a flow diagram of a process for managing transactions according to an embodiment of the invention.

FIG. 4 is a flow diagram of a process for managing transactions according to an embodiment of the invention. In process block 402, a request for a read access to a data is received from an entity. The data is typically stored in a basis memory. In decision block 404, if the entity is not a current entity, the process moves to process block 408 where the data is read from the basis memory. The current entity is an entity that has initiated a transaction on the data and has locked the data for exclusive write access. In decision block 404, if the entity is a current entity, the process moves to process block 406 where the transaction memory is searched for a new data. The new data is a change to the data made by the current entity. In decision block 410, if the new data is found in the transaction memory, the process moves to process block 412 where the new data is read from the transaction memory. In decision block 410, if the new data is not found in the transaction memory the data is read from the basis memory 408.

Figure 5:
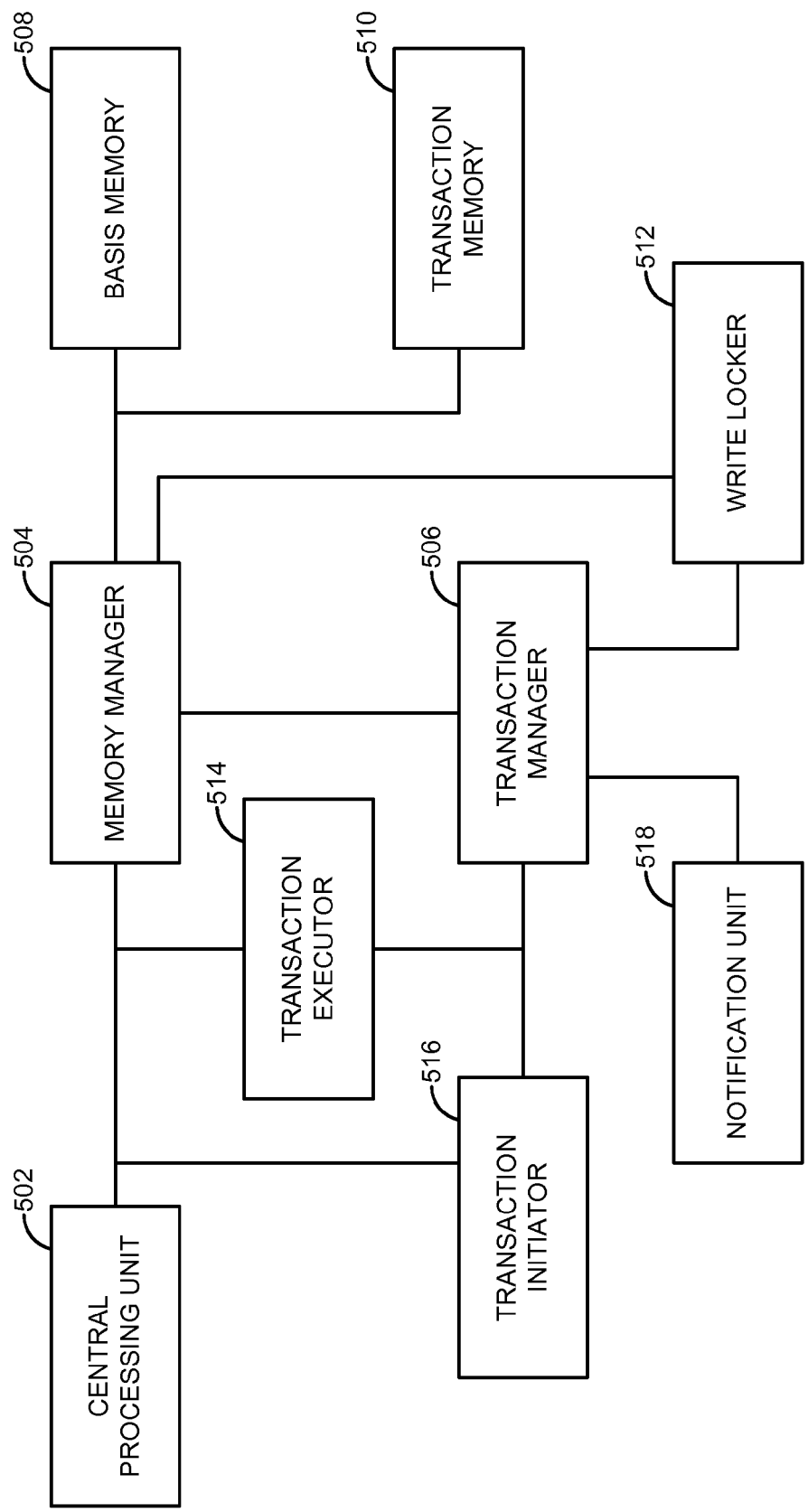
FIG. 5 is a block diagram of a system for managing transactions useful for implementing the invention according to an embodiment of the invention.

FIG. 5 is a block diagram of a system for managing transactions useful for implementing the invention according to an embodiment of the invention. Memory manager 504 receives requests for access to basis memory 508 from central processing unit 502. The requests for access to basis memory 508 typically include one or more read accesses or write accesses to data stored in basis memory 508. The data stored in basis memory 508 includes a set of data, a cluster of data, a page of data and the like.

Transaction manager 506 typically manages one or more transaction initiated on the data stored in basis memory. Transaction manager 506 typically controls memory manager 504, transaction initiator 516, write locker 512, notification unit 518 and transaction executor 514. Requests for the initiating transactions are usually made by one or more entities through central processing unit 502. In an embodiment, an entity may either be a user or a computer program.

On receipt of a request from central processing unit 502 for initiating a transaction on the data stored in basis memory 508, transaction initiator initiates the transaction. Almost immediately after transaction initiator 516 initiates the transaction on the data, write locker 512 locks the data for the exclusive write access to an entity responsible to initiate the transaction. Locking the data for exclusive write access by the entity disallows any other entity to initiate a write access to the data. After the data is locked by write locker 512 for exclusive write access by the entity, it is the responsibility of transaction manager 506 to check whether a subsequent request for write access is received from the entity that has locked the data or from any other entity. Write access to the data is denied to the other entity. For every request for read access or write access received from an entity, transaction manager 506 checks and determines whether the request is received from the entity that has locked the data for exclusive write access or not.

As the request for write access is made from the entity that has locked the data, transaction manager 504 directs memory manager 504 to move a change in the data as second data to transaction memory 510. On receipt of further requests for write access on the data from the entity, transaction manager 506 checks whether a change in the data exists as the new data in transaction memory 510. If the new data is found in transaction memory 510, transaction manager 506 makes subsequent changes to the new data in transaction memory.

As a request for read access is received from the entity that has locked the data for exclusive write access, transaction manager checks whether a change in the data exists as the new data in transaction memory 510. If the new data is found in transaction memory 510, the new data is read by memory manager 504 and sent back to central processing unit 502. If the new data is not found in transaction memory 510, the data is read from basis memory 508 by memory manager 504 and sent back to central processing unit 502.

As a request for read access is received from another entity while the entity has lock on the data for exclusive write access, memory manager 504 simply reads the data from basis memory 508.

Transaction executor 514 terminates a transaction by initiating either a commit or a rollback. If a commit is initiated by an entity, transaction executor 514 replaces the data in basis memory 508 with the new data in transaction memory 510. if a rollback is initiated by an entity, transaction executor 514 deletes the new data in transaction memory 510 without changing the data in basis memory 508. On the completion of each commit or rollback, transaction executor terminates the transaction.

On initiation of a transaction by an entity on the data in basis memory 508, it is the responsibility of notification unit 518 to notify the entity if another transaction already has locked the data for exclusive write access.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A method comprising:
   initiating a transaction on data by a first entity, the data being stored in a basis memory;
   locking the data in the basis memory for exclusive write access by the first entity;

modifying the data in the basis memory by the first entity;

storing the modified data in a transaction memory;

receiving a request from an entity for reading the data, during the initiated transaction;

upon determining that the requesting entity is the first entity, reading the modified data from the transaction memory;

upon determining that the requesting entity is a second entity, reading the original data from the basis memory; and unlocking the data in the basis memory when the first entity initiates a commit or rollback on the transaction.

2. The method of claim 1 further comprising:

replacing the data with the modified data in the basis memory in response to initiating the commit on the transaction.

3. The method of claim 1 further comprising:

deleting the modified data from the transaction memory in response to initiating the rollback on the transaction.

4. The method of claim 1 further comprising the step of making a change to the modified data in the transaction memory.

5. The method of claim 1 further comprising the step of assigning a unique identifier to the transaction.

6. The method of claim 1 further comprising the step of determining whether the request for reading the data is received from the first entity or the second entity.

7. The method of claim 1 further comprising:

receiving the request for reading the data from the first entity;

determining whether the modified data exists in the transaction memory;

reading the modified data from the transaction memory; and reading the data from the basis memory upon determining that the modified data does not exist in the transaction memory.

8. The method of claim 1 further comprising the step of notifying the second entity that the transaction on the data is already active.

9. A system comprising:

a basis memory for storing data;

a transaction memory electronically coupled to the basis memory for storing a modified data;

a transaction initiator for initiating a transaction on the data by a first entity;

a write locking unit electronically coupled to the transaction manager for locking the data in the basis memory for exclusive write access by the first entity;

a transaction manager electronically coupled to the transaction initiator for storing the modified data in the transaction memory;

a memory manager electronically coupled to the transaction manager, the basis memory and the transaction memory for reading the modified data from the transaction memory when a request for reading the data is received from the first entity during the initiated transaction and reading the data from the basis memory when the request for reading the data is received from a second entity during the initiated transaction; and the write locking unit for unlocking the data in the basis memory when the first entity initiates a commit or rollback on the transaction.

10. The system of claim 9 further comprising a transaction executor electronically coupled to the transaction manager for committing and rolling back the transaction.

11. The system of claim 9 further comprising a notification unit for notifying the second entity that the transaction on the data is already active.

12. A machine-accessible storage medium that provides instructions that, when executed by a machine, cause the machine to perform operations comprising:

initiating a transaction on data by a first entity, the data being stored in a basis memory;

locking the data in the basis memory for exclusive write access by the first entity;

modifying the data in the basis memory by the first entity;

storing the modified data in a transaction memory;

receiving a request from an entity for reading the data, during the initiated transaction;

upon determining that the requesting entity is the first entity, reading the modified data from the transaction memory;

upon determining that the requesting entity is a second entity, reading the data from the basis memory; and unlocking the data in the basis memory when the first entity initiates a commit or a rollback on the transaction.

13. The machine-accessible medium of claim 12 further providing instructions which when executed by the machine cause the machine to perform further operations comprising:

replacing the data with the modified data in the basis memory in response to initiating the commit on the transaction.

14. The machine-accessible medium of claim 12 further providing instructions which when executed by the machine cause the machine to perform further operations comprising:

deleting the modified data from the transaction memory in response to initiating the rollback on the transaction.

15. The machine-accessible medium of claim 12, wherein the write access of the second entity to the data is locked till the first entity commits or rolls back the transaction.

16. The machine-accessible medium of claim 12 further providing instructions which when executed by the machine cause the machine to perform further operations comprising the step of making further modification to the modified data in the transaction memory.

17. The machine-accessible medium of claim 12 further providing instructions which when executed by the machine cause the machine to perform further operations comprising the step of assigning a unique identifier to the transaction.

18. The machine-accessible medium of claim 12 further providing instructions which when executed by the machine cause the machine to perform further operations comprising the step of determining whether the request for reading the data is received from the first entity or the second entity.

19. The machine-accessible medium of claim 12 further providing instructions which when executed by the machine cause the machine to perform further operations comprising:

receiving the request for reading the data from the first entity;

determining whether the modified data exists in the transaction memory;

reading the modified data from the transaction memory; and reading the data from the basis memory if the modified data does not exist in the transaction memory.

* * * * *